(12) United States Patent
Bullock

(10) Patent No.: US 6,227,779 B1
(45) Date of Patent: May 8, 2001

(54) CARGO RESTRAINT METHOD FOR A TRANSPORT CONTAINER

(76) Inventor: Matthew Bullock, 3315 16th St. NW. Suite B, Washington, DC (US) 20010

( * ) Notice: Subject to any disclaimer, the term of this patent is extended or adjusted under 35 U.S.C. 154(b) by 0 days.

(21) Appl. No.: 09/518,545

(22) Filed: Mar. 3, 2000

Related U.S. Application Data

(62) Division of application No. 09/027,958, filed on Feb. 23, 1998, now Pat. No. 6,089,802.

(51) Int. Cl.$^7$ ......................................................... B60P 7/08
(52) U.S. Cl. ................................ 410/98; 410/34; 410/100
(58) Field of Search .................................. 410/32, 34, 36, 410/42, 96, 97, 100, 155; 220/1.5; 206/597, 410; 53/399, 441, 462, 556; 248/499

(56) References Cited

U.S. PATENT DOCUMENTS

| | | | |
|---|---|---|---|
| 2,269,286 | * | 1/1942 | Ott .......................................... 410/97 |
| 3,547,457 | | 12/1970 | Langer . |
| 3,848,889 | | 11/1974 | Sharrow . |
| 3,897,919 | * | 8/1975 | Weingarten ............................. 410/97 |
| 3,910,558 | | 10/1975 | Brucker et al. . |
| 4,111,132 | | 9/1978 | Plut . |
| 4,264,251 | | 4/1981 | Blatt ...................................... 410/100 |
| 4,846,610 | | 7/1989 | Schoenleben ........................... 410/96 |
| 4,964,771 | * | 10/1990 | Callihan ................................ 410/118 |
| 5,219,251 | | 6/1993 | Kanczuzewski ....................... 410/127 |
| 5,516,244 | * | 5/1996 | Baka ....................................... 410/36 |
| 5,784,761 | * | 7/1998 | Allen .................................. 410/97 X |
| 6,089,802 | * | 7/2000 | Bullock .................................. 410/97 |

OTHER PUBLICATIONS

"Reduce Damage to Bags," Modern Railroads, Apr. 1954, pp. 143–44.

"Superior equipment capacity spurs B.C. paper maker's switch to CP Rail," CP Rail Report, Sep./Oct. 1989, p. 1.

Freight Restraint System, "TY–GARD", Sales Brochure, by Walnut Industries.

* cited by examiner

Primary Examiner—Stephen T. Gordon
(74) Attorney, Agent, or Firm—Bradford Kile; Kile Goekjian Lerned & Reed PLLC

(57) ABSTRACT

A load restraint method for securing cargo within transport containers such as intermodal containers including first and second load restraining strips with an adhesive coating on one surface of the strips for adherence to sidewalls of an intermodal container and a locking load restraining strip for bonding the free ends of the first and second load restraining strips together into a load restraining system.

10 Claims, 5 Drawing Sheets

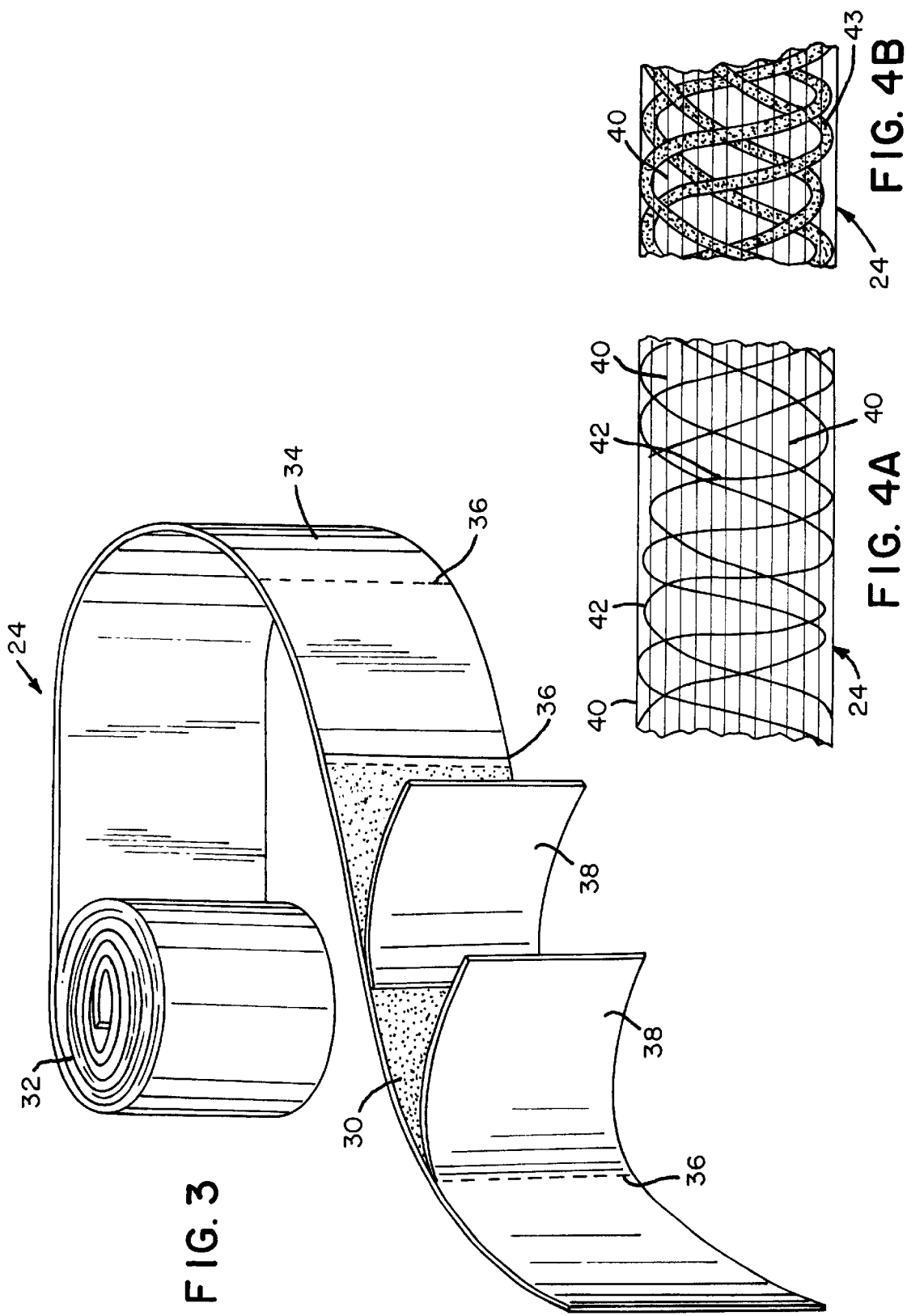

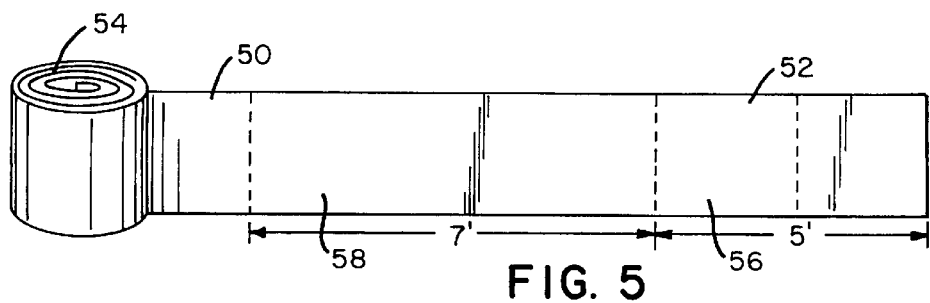
FIG. 5
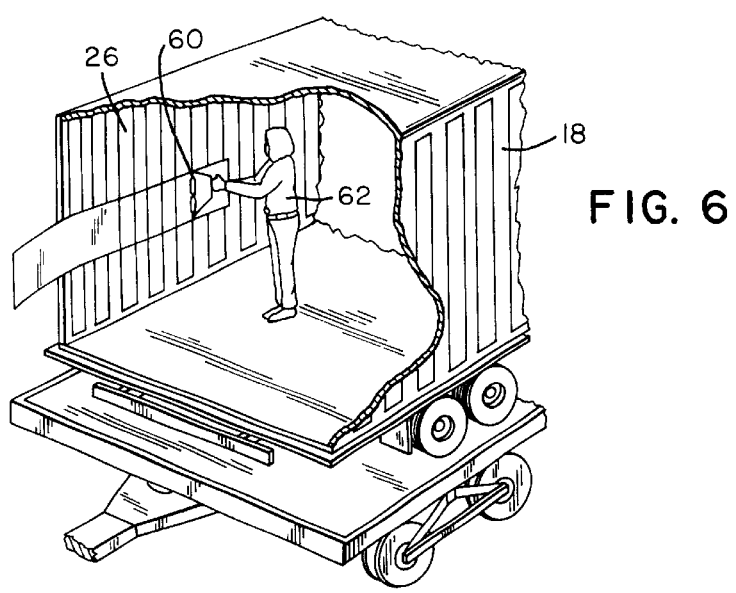
FIG. 6
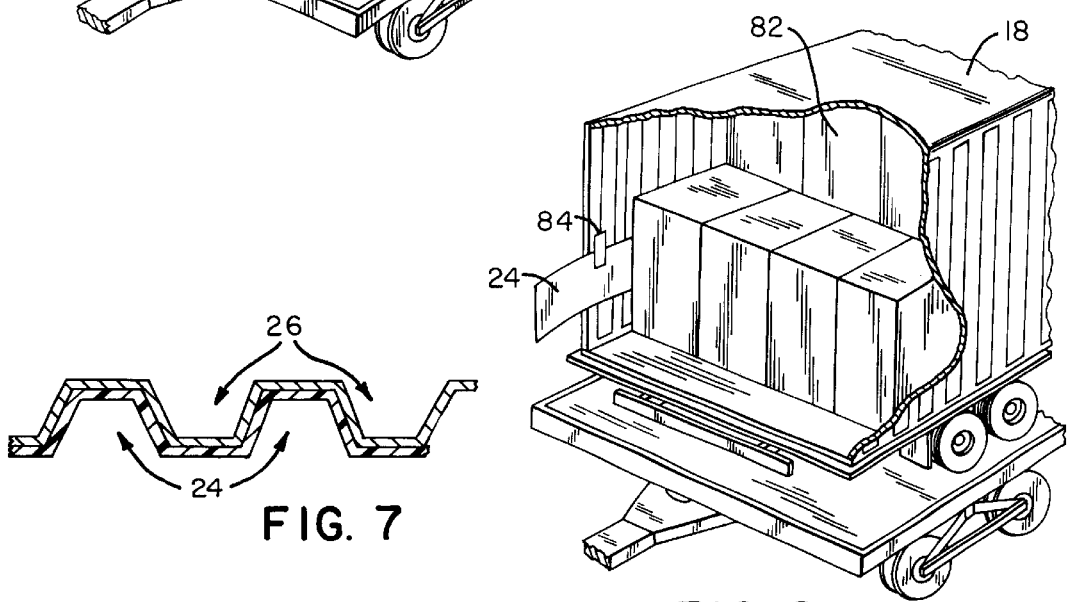
FIG. 7
FIG. 8

CARGO RESTRAINT METHOD FOR A TRANSPORT CONTAINER

RELATED PATENTS

This application is a divisional of application Ser. No. 09/027,958 date Feb. 23, 1998 entitled "Cargo Restraint System for a Transport Container" now U.S. Pat. No. 6,089,802, of common inventorship and ownership as the subject application.

BACKGROUND OF THE INVENTION

This invention relates to an improved system and method for restraining cargo during transportation. More particularly, this invention relates to a novel system and method for securing and restraining undesired movement of boxes, palletized or not palletized, drums, and the like within the interior of an intermodal container in ship cargo holds, placed on flatbed truck trailers, on railroad flatcars, and the like.

Most shipments for export, both in the United States and abroad, are placed into either twenty or forty foot long, rectangular, intermodal containers. These containers are fabricated with steel, corrugated sidewalls and are structurally self-supporting and rugged. Several intermodal containers may be stacked on top of each other for transport by sea, rail, or road. Within the containers, drums or boxes hold actual product. The cargo of these intermodal containers experiences various forces throughout the course of transport.

When traveling by rail, flatbed rail cars transporting intermodal containers may be made up through a process called humping. In this process, a flatbed rail car is pushed over an elevated section of tracks and then allowed to roll into a switching yard, where the cars are switched to make up train segments. When a car is rolled into a stationary string of cars, the impact causes the couplings to lock together. This impact, however, can also apply a force to the cargo of the magnitude of several times the force of gravity. Moreover, during transport, cars are subject to sudden braking forces, run-in and run-out impact over grades, rail vibration, dips in the track, and swaying. When intermodal containers are transported by sea, the cargo therein is subjected to rolling storm forces including: yaw, pitch, heave, sway, and surge. On the highway, intermodal containers and the cargo therein experiences acceleration and centrifugal loads, sudden braking, and vibration. Each of these forces has the potential to impart a substantial force on an intermodal container.

During transportation, an intermodal container and its cargo are two separate entities for the purposes of motion. The container may be mounted in a ship's cargo hold, on a flatbed railcar, on a flatbed truck trailer, or the like. The cargo, however, unless secured to the container is free to move within the interior of the intermodal container.

When the container changes direction or speed, the cargo tends to continue along the previously existing path until it contacts an interior wall of the container. Without some type of restraint and/or cushioning system, the cargo builds up considerable momentum, independent of the container. The amount of momentum is equal to the object's mass multiplied by its velocity. In the case of large cargo loads, even the slightest change in direction, or velocity, can generate substantial momentum. When cargo contacts the interior walls or doors of the container, the force necessary to reduce this momentum to zero is absorbed by the goods. Such forces may result in damage to the cargo, damage to the interior walls or doors of the container, damage to the cargo packaging, and may create dangerous leaks if the cargo is a hazardous material. Accordingly, it is undesirable to permit cargo to gain any momentum independent of the container. This is accomplished by restraining the cargo within the container so that the cargo and the container are essentially united during transport and operationally functioning as one object.

Accordingly, in the past, lading has been secured in the container to eliminate unwanted movement or shifting during transport. The drums, boxes, or other containers have been restrained in several different ways. Primarily, cargo was stabilized by a method of load-locking and lumber bracing. This system involves strategically placing lumber between a loadface and the rear doors of a container. This, however, can be a costly, time consuming, and generally inefficient means of securing a load. In this, the blocking process requires carpenters and is often outsourced to contractors. Accordingly, wood barriers can be time consuming to install and not very cost effective. Still further, wood bracing can be somewhat brittle and subject to failure under an abrupt impact. Moreover, conventional methods of load-locking and lumber bracing simply could not perform some tasks. For example, the most efficient means of filling an intermodal container is eighty fifty-five gallon drums double stacked in a twenty-foot long container. If this is done, however, there are only approximately one to two inches between the loadface and the rear doors. One to two inches is not enough space to put sufficient lumber to brace a load of eighty drums adequately. Consequently, when wood bracing was utilized as a system of restraint, shippers were forced to ship containers that were not filled to capacity, thereby reducing transport efficiency and increasing transportation costs.

Similarly, the Bureau of Explosives has established a standard of review to determine if a particular restraint system is capable of adequately securing hazardous cargo. In certain instances, conventional load-locking and lumber bracing was not able to receive approval to ship hazardous cargo by the Bureau.

Other known means of restraint employed ropes, straps, or stands. Methods appearing in the past have tended to exhibit impaired performance and are often not functionally suitable to restrain loads under even moderate conditions. Consequently, a need exists for securing lading in intermodal containers that is functionally effective, cost-efficient, labor-efficient, and able to comply with Department of Transportation and Bureau of Explosives regulations.

At least one method and apparatus for restraining cargo movement which overcomes some of the foregoing limitations is disclosed in U.S. Pat. No. 4,264,251, of common assignment with the subject application. The invention disclosed in that patent comprises sealing strips that are adhered to opposing sidewalls of a container, a strip of bracing material, and an adjoining mechanism used to bind the ends of the strips together into a secure and taut restraint. The disclosure of this patent is hereby incorporated by reference as though set forth at length. Thus, the concept of a strip of material being used as a barrier to restrain cargo or lading is disclosed in the '251 patent.

In the '251 patent, material strips were applied in a manner similar to hanging wallpaper, wherein a separate adhesive was applied to the surface where adhesion was desired. Then the retaining strip was applied. In addition to this requirement of a separate adhesive, the systems in the past had problems with weakness at the joints. At the juncture where the strips came together, an opportunity existed for slippage of the joined panels. Moreover, intermodal containers have corrugated walls. These corrugations make applying a restraining strip to a separate adhesive, which may not have an even application, substantially more difficult.

Restraining systems in the past required multiple elements, were difficult to store, were arduous to install, and often required a degree of skilled labor. Systems using straps, nails, anchors, or bolts all require substantial storage space even when not in use. Furthermore, such systems increase the safety risk to the workers restraining the cargo.

Still further, products and procedures used in the past relying on accessories located in the cargo container often were not able to secure a partial load. That is, if the load does not extend to the far rear of the container, the necessary anchors may not be available in an area where they can be used.

The problems suggested in the foregoing are not intended to be exhaustive but rather are among many which may tend to reduce the effectiveness of cargo restraining systems. Other noteworthy problems may also exist; however, those presented above should be sufficient to demonstrate that cargo-restraining systems appearing in the prior art have not been altogether satisfactory.

OBJECTS AND SUMMARY OF THE INVENTION

Objects

It is a general object of the subject invention to secure a load within a truck trailer, boxcar, intermodal container, transport container, or the like which will obviate or minimize problems of the type previously discussed.

It is another object of the subject invention to reduce the material and labor costs involved in securing a load within an intermodal container.

It is still another object of the subject invention to protect cargo from damage during transport.

It is yet another object of the subject invention to provide a system capable of restraining eighty, fifty-five gallon drums, double stacked, in a twenty-foot intermodal container capable of receiving Department of Transportation and Bureau of Explosives approval.

It is a particular object of the subject invention to provide a method for securing cargo that is entirely self-contained and may be installed quickly, reliably, and efficiently by unskilled labor, even in intermodal containers having corrugated walls.

It is another object of the subject invention to provide for efficient and simple removal of the securing system at a cargo destination.

It is a further object of the subject invention to enable customization of the placement of the adhesive to increase efficiency in cost of production and decrease the amount of adhesive that is unused in the process.

It is still a further object of the subject invention to provide a system for restraining cargo that is able to withstand a wide range of temperatures and levels of humidity to enable use in all climates.

Brief Summary of the Invention

One preferred embodiment of the invention that is intended to accomplish at least some of the foregoing objects comprises a flexible, substrate or strip, material that is resistant to axial lengthening when placed in tension under the weight of a cargo load. One side of the strip is laminated with a self-adherent adhesive. A release paper is applied over the adhesive and the strip is suitable to be wound on a core. The release paper is separated into panels at transverse intervals and is readily separable from the adhesive. The panels may be separated by perforations, butted up against one another, or overlapped.

In use, a length of release paper is peeled away and torn off at a transverse separation between separate panels of release paper. Next, the adhesive face is self-adhered to an interior side of an intermodal container, transport container, tractor-trailer, boxcar, or the like. The release paper is not removed from the remaining portion of the strip. A second strip is applied to the opposite side of the container and the two strips are wrapped around goods to be contained. The ends of opposing strips, which were extending from the rear of the container, are overlapped at a center location at the end of a load. Tensioning tools are used to wind the two lapped ends to draw the opposing strips taut. The release paper is then removed from the overlapped region. A third, shorter piece of the strip material, is cut from the roll and its release paper is removed. This shorter strip is adhered to the exposed adhesive of the opposing strips at the joint. The shorter piece thus locks the strips in place with an adhesive-to-adhesive seal and forms a secure load restraining system.

THE DRAWINGS

Other objects and advantages of the present invention will become apparent from the following detailed description of a preferred embodiment taken in conjunction with the accompanying designs wherein:

FIG. 3 is a pictorial view of the present invention showing both the first and second sides of the restraining strip, wherein the second side carries a releasable paper covering having periodic transverse separations;

FIGS. 4A and 4B depict an alternate method of positioning the reinforcing strands in the restraining strip, a sinusoidal and a longitudinal, parallel pattern;

FIG. 5 depicts an alternate strip wherein the adhesive on the strip is not continuous but rather placed on the strip in such locations, for example, five feet of adhesive and then seven feet of no adhesive, so as to customize it to the needs of a particular customer;

FIG. 6 depicts the first step in a method of use of the present invention wherein the release paper is removed to expose the adhesive and the strip is applied to a corrugated, interior wall surface of an intermodal container;

FIG. 7 depicts a sectional view of the restraining strip intimately adhered to the corrugated interior of a sidewall of an intermodal container;

FIG. 8 is a second step in the use of the present invention wherein two opposing strips extending out the back of the container are prepared to be overlapped across the rear of the load;

Figure 11:
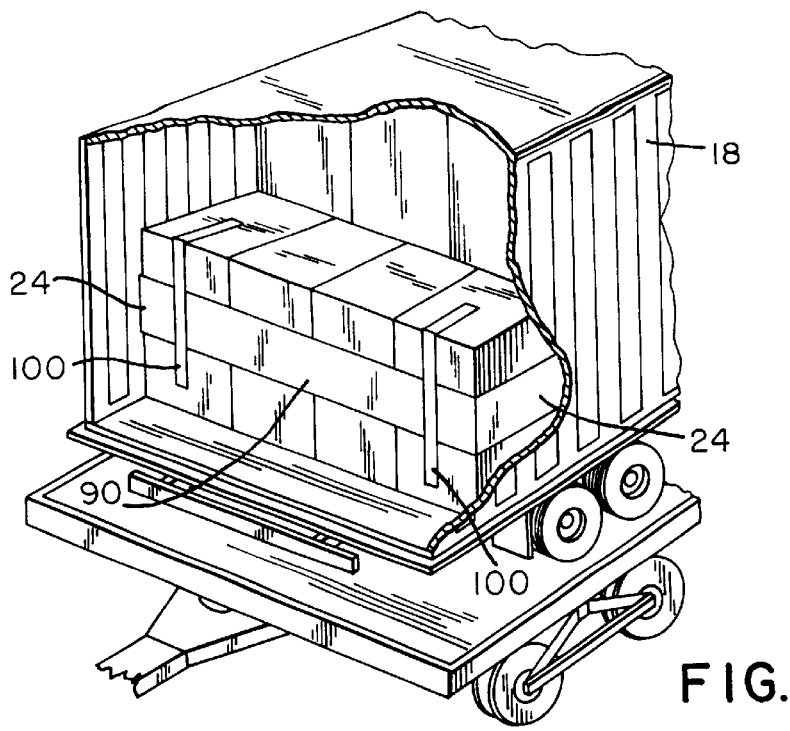
Figure 12:
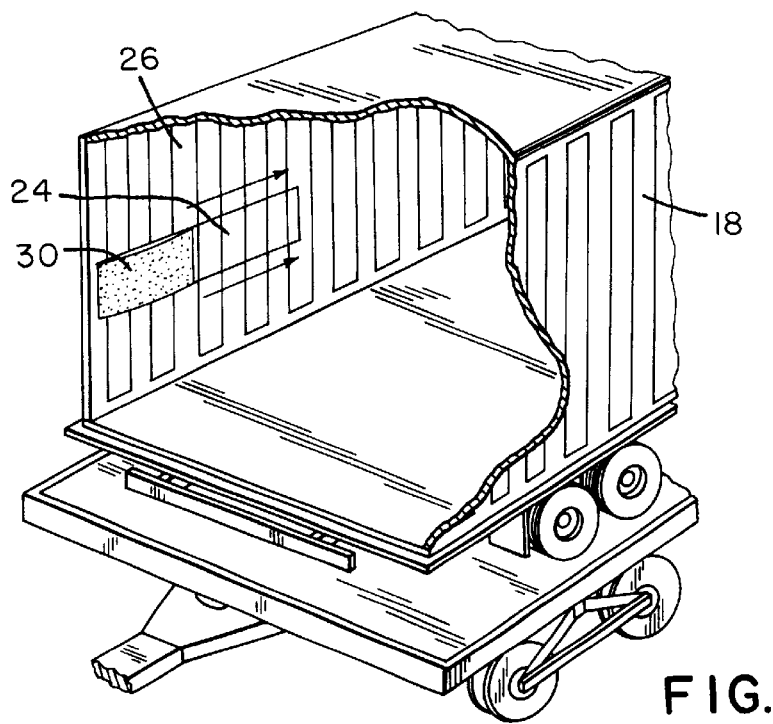

FIG. 11 is the last step in the use of the present invention wherein a short segment of the strip is cut, the release paper is removed exposing the adhesive and the strip is used to secure the barrier strips within a secure adhesive-to-adhesive junction across the joint; and FIG. 12 depicts the removal and disposal of the barrier strip from a container wherein the receiver cuts the barrier strips in the rear, removes the freight, and peels the strip toward the front of the container.

DETAILED DESCRIPTION

Context of the Invention

Figure 1:
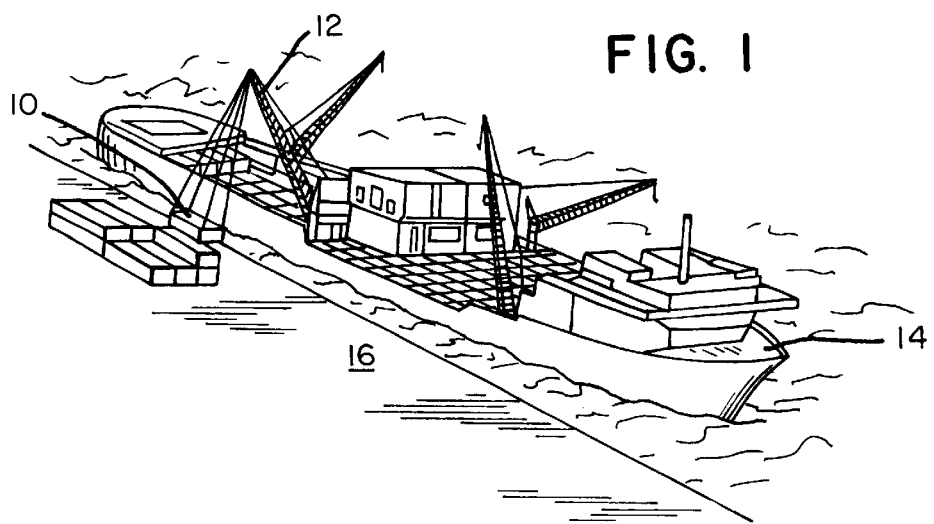
FIG. 1 is an aerial view of a ship at a dock, lifting and loading an intermodal container with a crane to be placed in the ship's cargo hold.

Referring now particularly to FIG. 1, there is shown one operative context of the subject invention, where intermodal containers 10 are being loaded onto a ship 14. The invention may be used to secure cargo in an intermodal container 10, like the one being loaded onto the ship. Specifically, FIG. 1 depicts a ship 14 at a dock 16 lifting and loading an intermodal container 10 with a crane 12 to be placed in the ship's cargo hold.

Figure 2:
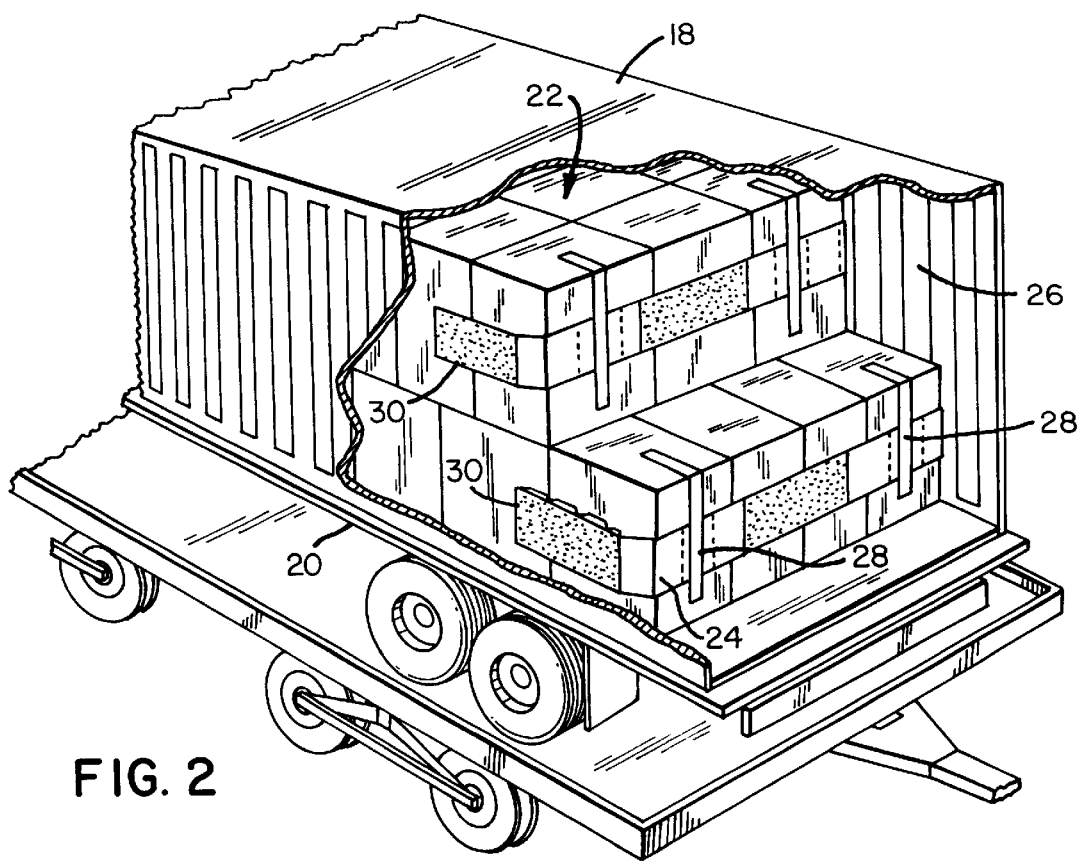
FIG. 2 is an axonometric view showing the interior of an intermodal container secured to a flatbed of a truck-trailer and positioned upon the bed of a railroad flat car for transport overland.

FIG. 2, an axonometric view that discloses the invention in another illustrative operating environment, i.e., a twenty-foot long intermodal container 18 is mounted upon a railroad flat car 20 for land transport. Containers such as these are also operable to be mounted on a flatbed truck-trailer and the like. Other environments in which the subject invention is equally suitable for use include truck-trailers, railroad boxcars, and the like, not shown.

FIG. 2, also depicts a partially cut-away view to enable a reader to visualize the manner in which a cargo restraining strip 24 is operably adhered to a corrugated, interior wall surface 26 of the cargo container 18. The adhesive strips 24 are attached to the corrugated, interior wall surface 26 of the cargo container 18 and then extending around the rear of a load 22.

It is also shown that the self-adhesive strips may be taped, as at 28, to the load 22 in order to avoid sagging of the strips in the event that the load is compressed due to a front-end impact. FIG. 2 further depicts the subject invention in a complete state suitable for transport without damage of the cargo.

Restraining Strip

Turning to FIG. 3, the restraining component 24 is disclosed in accordance with a preferred embodiment of the invention. More particularly, a roll 32 of a polyester substrate strip 24 is depicted. Preferably, the substrate strip is fifteen inches in width; however, other widths may be substituted depending on the need for additional strength, which a wider strip could provide. The polyester strip 24 is preferably a film of spun bonded olefin but may also be comprised of acrylic, a resin differential polymer, or VALE-RON®. Companies such as DuPont, Hoeschst Celanese, and others manufacture such materials. The strip 24 may be monolithic or inlaid with polyester or polyethylene fiber reinforcement strands in a parallel array. As depicted in FIG. 4A, a sinusoidal crossing pattern of reinforcement strands 42 may be used in conjunction with a longitudinal, parallel pattern of strands 40 to provide added strength to the restraining strip both longitudinally and laterally. Alternately, as depicted in FIG. 4B, a longitudinal crossing pattern of reinforcing straps 43 may be used alone or in conjunction with strands 40 to provide enhanced stability and resistance to droop in the event of slackness created by settling of a load slightly forward.

Returning to FIG. 3, an adhesive coating is coextensively applied to a first side of the restraining strip and is operable to adhesively bind the restraining strip 24 to a corrugated side wall 26 of a container, note again FIG. 2. The adhesive is preferably composed of acrylic but may also be resin or differential polymers. The adhesive 30 is an acrylic adhesive that exhibits the characteristics of high tack, high peel, and high shear strength. The adhesive 30 bonds well to glass, metals, paper, and films. Additionally, it has excellent cold temperature resistance and had a built-in ultraviolet stabilizer system. The polyester reinforcing fibers that comprise the strip may be assembled or woven in various patterns. The fibers may be arranged longitudinally, laterally, diagonally, sinusoidally, or in any combination of the patterns. Moreover, these reinforcing fibers may be comprised of single strands or bundles of many strands, or any combination thereof.

A release paper 34 is applied over the adhesive coating on the first side of the restraining strip and is cut with perforation columns 36 preferably at one or two foot intervals of longitudinal separation. Alternatively, separate, non-perforated, panels of release paper 38 may be used, butted up against one another end-to-end, or overlapped slightly at one end. Alternatively, divisions of the release paper and adhesive may be used at periodic intervals; however, one or two foot sections are preferred.

An alternate embodiment of the present invention is disclosed in FIG. 5 and comprises an adhesive applied to a substrate strip 50 only on pre-selected portions of the strip. This selective placement of the adhesive 52 allows a roll 54 of restraining strip 50 to be customized to the needs of a particular customer. As a result, the adhesive and release paper would only be placed where it is necessary to be used and not in the areas where the customer does not anticipate needing an adhesive component applied to the restraining strip. Selective application of adhesive allows a lower cost to the consumer and a higher level of economy for an overall system. In this instance, an adhesive-to-adhesive bond will not be formed and the overlapped junction will rely on a single layer of adhesive bond.

For example, an intermodal container that this product is designed to be used in is either twenty or forty feet in length, ninety-two inches (seven feet, eight inches) wide, and ninety-two inches high. Although certain embodiments of the invention, such as depicted in FIG. 2 are adaptable to containers of all sizes, if a customer is exclusively using an intermodal container having these dimensions, the adhesive from the glueline on the sidewall to the central overlapping portion would never be exposed for use. Thus, if the restraining strip is manufactured such that there is five feet of adhesive 56 and then seven feet of no adhesive 58, and repeating, the costs of adhesive could be reduced and little if any adhesive would be left unused.

Method of Restraining Cargo Using a Polyester Adhesive Strip

Attention is now invited to FIGS. 6–11 where a sequential method is disclosed for using the restraining strip 24 to secure a load in accordance with a preferred embodiment of this invention.

FIG. 6 discloses the first of four general steps. To begin, a user 62 cuts three strips of the polyester restraining material 24 from a roll 32 for each load barrier required. Two of the lengths are cut to twelve (12) feet and the third strip is cut to five (5) feet. A glueline should start two (2) feet back and extend at least five (5) feet towards the nose of the container from the loadface in order to ensure only a sheer pull on an adhered portion of the strip in the event of any unintended force acting on the cargo.

A user 62 peels the release paper 34 from the polyester restraint strip 24 to expose a length of adhesive 30. The adhesive side of the strip 24 is then applied to a corrugated, interior wall surface 26 of the container substantially parallel to the container floor. Although not all walls of every container are corrugated, should the walls of the container be corrugated, it is important for the user to follow the contours of the corrugations. This method of application allows for superior gripping than methods known in the prior art. The strip moving in and out of the undulations is depicted in greater specificity in FIG. 7.

FIG. 7 depicts a sectional view of the restraining strip 24 intimately adhering to a corrugated, interior wall 26 of an intermodal container 18 to provide additional security and exercise added restraint on the load.

Turning back to FIG. 6, as the adhesive is pressure sensitive, a bonding roller 60 is used to firmly secure the strip to the interior wall 26 of the container 18 in a manner similar to the proceeding depicted in the previously noted U.S. Pat. No. 4,264,251. This process of positioning a strip 24 and adhesion is repeated on the opposing side of the container. The two strips 24 then project out the rear of the container 18 and the container is loaded. The strips 24 are then wrapped around the load far enough so that they overlap.

In FIG. 8, the cargo or lading 82 has been loaded into the container 18 and the strips 24 extending from the container 18 are prepared to be overlapped with the opposing strip. The polyester restraining strips 24 are the wrapped around the end of the load 82 and the release paper 34 faces outward away from the cargo or lading 82.

An optional means of temporarily securing the restraining strip 24 is also depicted in FIG. 8. A restraining strip 24 may be temporarily taped to the interior wall 26 of the container, shown at 84, while the user is adhering the opposite side, prior to the overlapping process.

Figure 9:
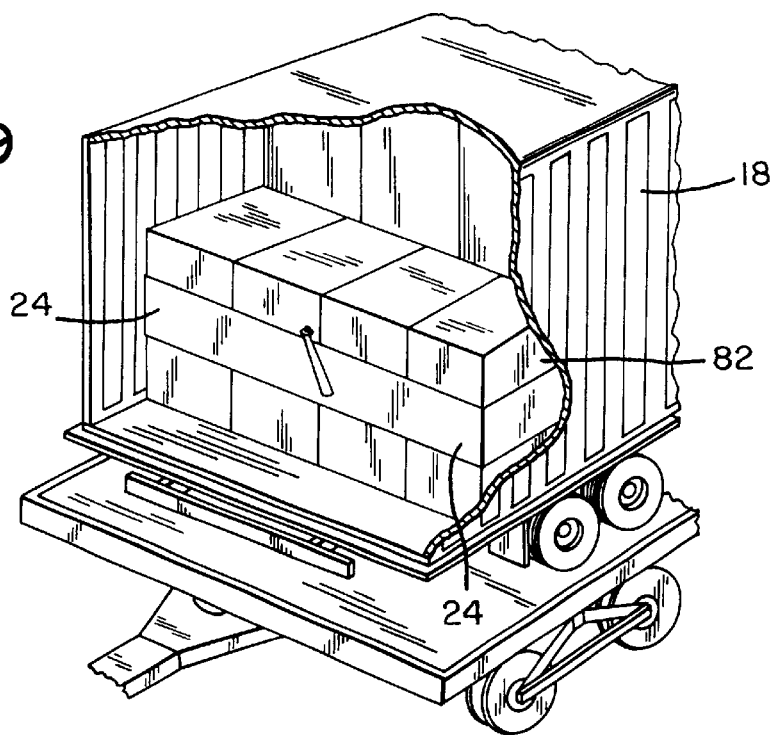
FIG. 9 is a third step in the use of the present invention wherein the overlapping strips are made taut and then the release paper is removed from a segment of the self-adhesive strips, on either side of the overlapping joint.

FIG. 9 depicts the third step in the process to use the present invention wherein the overlapping strips 24 are made taut and then the release paper is removed. A user 62 inserts a tension tool (clothespin) 94 into the overlapping portion. Then the user 62 places the small wrench 96 on first with the long handled wrench 98 on top (with the handle flush against the load). Lastly, the user 62 tensions the overlapping strips 24 with the small wrench 96.

Figure 10:
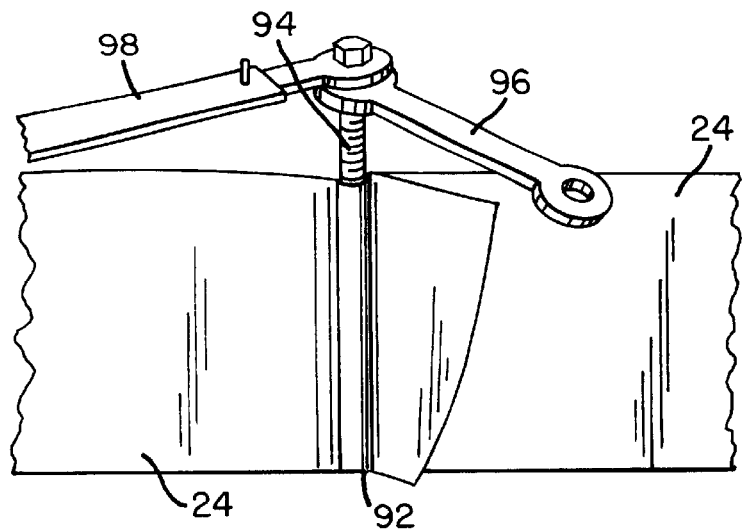
FIG. 10 depicts with greater detail, the use of tensioning tools to make the overlapped strips taut.

The use of the tensioning tools is shown with greater detail in FIG. 10. This process is fully disclosed in U.S. Pat. No. 4,264,251, previously incorporated by reference and thus will not be repeated at length here except to note that the process briefly described creates a vertical joint 92 between the two strips 24.

Once the retaining strips are drawn taut, at least a five (5) foot strip of adhesive is exposed by the removal of the release paper. In FIG. 11, a user 62 removes the release paper 34 from the third strip of material 90 preferably in a five (5) foot length, and places it across the joint 92 formed by the two overlapping strips 24. In this location, the adhesive has already been exposed, as noted above. The third piece 90 of the restraining material is rolled to assure a secure adhesive-to-adhesive bond between the three strips. It is the adhesive-to-adhesive bond formed at this stage that creates added safety and security of the present invention.

A final, optional, step of the process is also depicted in FIG. 11. In this optional step, tape 100 is used to secure the barrier strip 24 formed by the polyester strips to the cargo or lading in order to prevent sagging in the event of compression due to a front-end impact.

Finally, FIG. 12 depicts the result of activity at a destination of a load that has been secured by the present invention. A receiver simply cuts the barrier strips 24 in the rear and removes the freight. After unloading, the receiver peels the polyester self-adhesive strips 24, attached to the corrugated, interior walls 26 toward the front of the container 18. This action is readily accomplished because the adhesive 30 has a high sheer pull strength but low normal peel resistance. After the material is peeled free from the interior wall of the container, it can be easily disposed of in a conventional manner.

Having described in detail a preferred embodiment of the invention, it may be useful to briefly set forth some of the major advantages of the invention.

SUMMARY OF MAJOR ADVANTAGES OF THE INVENTION

This subject invention provides a polyester strip, wherein the necessary adhesive is already present on the polyester strip and can be brought to use by merely peeling a release paper, preferably on a perforation column, so that the release paper may be torn off and the adhesive exposed, thereby requiring no additional adhesive for the interior of a container in order to restrain the cargo to be transported.

This invention also provides an entirely self-contained load restraint system because having the adhesive already present on the strip would eliminate the need for additional loading space for materials.

This invention further provides an adhesive backed strip for restraining freight and cargo that has a wide temperature gradient so that it can withstand travel through most climates.

This invention still further enables one single product to safely secure an entire load or even only a partial load and moreover, to accomplish this without having to brace, nail, anchor, strap, or bolt, thereby substantially educing labor costs and installation time.

This invention still further provides a product for restraining a load having enhanced sheer strength and minimum peel resistance so that, upon arrival at the destination, it may be quickly removed and disposed.

This invention yet further provides for superior gripping and restraining due to the adhesion following the undulations of the corrugated, interior walls of the intermodal container.

This invention yet still further provides an adhesive-to-adhesive bond, at the rear of the load. Once the load is packed and the strips are overlapped, the release paper covering the adhesive is removed and a third strip is adhered to the joint where the two lapped strips are already present. This provides for a more safe and secure joint than could be created with strip systems before the invention of this system employing self-adhesive strips.

In describing a restraining system and process for use in securing cargo while in transport in accordance with a preferred embodiment of the invention those skilled in the art will recognize several advantages which singularly distinguish the subject invention from the heretofore known prior art.

A particular advantage of the subject invention is the capability to secure full or partial loads with only one product.

Another significant advantage of the subject invention is ability to customize the roll of polyester self-adhesive material to the needs of a particular customer.

Yet another significant advantage of the subject advantage is the strength of the barrier formed by the adhesive-to-adhesive bond formed at the rear of the load.

A further significant advantage of the subject invention is the ability to withstand the substantial force generated by restraining eighty fifty-five gallon drums, double stacked, in a twenty foot long container.

In describing the invention, reference has been made to a preferred embodiment. Those skilled in the art, however, and familiar with the disclosure of the subject invention, may recognize additions, deletions, substitutions, modifications and/or other changes which will fall within the purview of the invention as defined in the following claims.

What is claimed is:

1. A method for securing cargo within an intermodal container, which cargo is subject to shifting forces, using a load restraint system, said method comprising the steps of:

cutting a first and a second load restraining strip of substantially equal lengths from a strip of a polyester substrate material having an adhesive applied upon one surface thereof and a coextensive release paper covering the adhesive, said first and second load restraining strips being operable to attachment at one end to an interior sidewall surface of an intermodal container and at the other end to extend at least partially across an unconfined end of a load to be restrained;

peeling a release paper from said first and second load restraining strips of said polyester material at one of the ends thereof;

applying said first and second load restraining strips of polyester material to opposite interior, corrugated wall surfaces of the intermodal container so that said first and second load restraining strips extend out the rear open end of the cargo container enough to be overlapped;

pressing the adhesive of said first and second load restraining strips against the corrugated interior wall surfaces of the intermodal container;

loading cargo into the intermodal container;

overlapping the ends of said first and second load restraining strips that extend out of the open end of the intermodal container;

drawing said first and second load restraining strips taut around the rear of the cargo at the overlapped location;

cutting a locking load restraining strip of substantially shorter length than the first and second load restraining strips from a strip of a polyester material having an adhesive coating on one surface and a coextensive release paper, said locking load restraining strip being operable to attachment at the junction location where said first and second load restraining strips are overlapped;

peeling the release paper from said load locking restraining strip; and adhering said locking load restraining strip to the first and second restraining strips at the overlapped portion at the open end of the intermodal container, thereby forming a secure load restraining system.

2. The method for securing cargo within an intermodal container using a load restraint system as defined in claim 1 wherein:

the step of adhering said locking load restraining strip to the first and second restraining strips at the overlapped portion at the open end of the intermodal container further comprises forming an adhesive-to-adhesive bond.

3. The method for securing cargo within an intermodal container using a load restraint system as defined in claim 2 and further comprising the step of:

taping the polyester material to the cargo to prevent sagging in the event of compression of the cargo due to a front-end impact.

4. The method for securing cargo within an intermodal container using a load restraint system as defined in claim 2, wherein:

said step of applying strips of polyester material to opposite interior walls of a cargo container involves temporarily taping the strips to the interior walls and rolling the strips to adhere the adhesive to the corrugated wall surface.

5. The method for securing cargo within an intermodal container using a load restraint system as defined in claim 2, wherein:

the step of peeling a release paper comprises tearing said release paper at a perforation column.

6. The method for securing cargo within an intermodal container using a load restraint system as defined in claim 2, wherein:

the step of peeling a release paper comprises peeling overlapping segments of said release paper.

7. A method for securing cargo within a transport container, which cargo is subject to shifting forces, using a load restraint system, said method comprising the steps of:

cutting a first and a second load restraining strip of substantially equal lengths from a strip of a polyester substrate material having an adhesive applied upon one surface thereof and a coextensive release paper covering the adhesive, said first and second load restraining strips being operable to attachment at one end to an interior side wall surface of a transport container and at the other end to extend at least partially across an unconfined end of a load to be restrained;

peeling a release paper from said first and second load restraining strips of said polyester material at one of the ends thereof;

applying said first and second load restraining strips of polyester material to opposite interior, wall surfaces of the transport container so that said first and second load restraining strips extend out the rear open and of the cargo container enough to be overlapped;

pressing the adhesive of said first and second load restraining strips against the interior wall surfaces of the transport container;

loading cargo into the transport container;

overlapping the ends of said first and second load restraining strips that extend out of an open end of the transport container;

drawing said first and second load restraining strips taut around the rear of the cargo at the overlapped location;

cutting a locking load restraining strip of substantially shorter length than the first and second load restraining strips from a strip of a polyester material having an adhesive coating on one surface and a coextensive release paper, said locking load restraining strip being operable to attachment at the junction location where said first and second load restraining strips are overlapped; and peeling the release paper from said locking load restraining strip; and adhering said locking load restraining strip to said first and said second restraining strips at the overlapped portion at the open end of the transport container, thereby forming a secure load restraining system.

8. The method for securing cargo within a transport container using a load restraint system as defined in claim 7 wherein:

the step of adhering said locking load restraining strip to the first and second restraining strips at the overlapped portion at the open end of the transport container further comprises forming an adhesive-to-adhesive bond.

9. The method for securing cargo within a transport container using a load restraint system as defined in claim 8 and further comprising the step of:

taping the polyester material to the cargo to prevent sagging in the event of compression of the cargo due to a front-end impact.

10. The method for securing cargo within a transport container using a load restraint system as defined in claim 8, wherein:

said step of applying strips of polyester material to opposite interior walls of a cargo container involves temporarily taping the strips to the interior walls and rolling the strips to adhere the adhesive to the wall surface.

* * * * *